Nov. 28, 1933.                H. E. JACKSON                1,936,876
SHOCK ABSORBER
Filed Dec. 22, 1927                 2 Sheets-Sheet 1
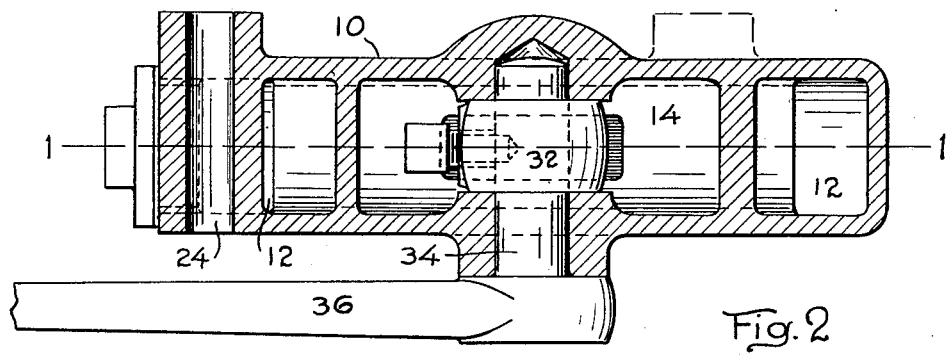
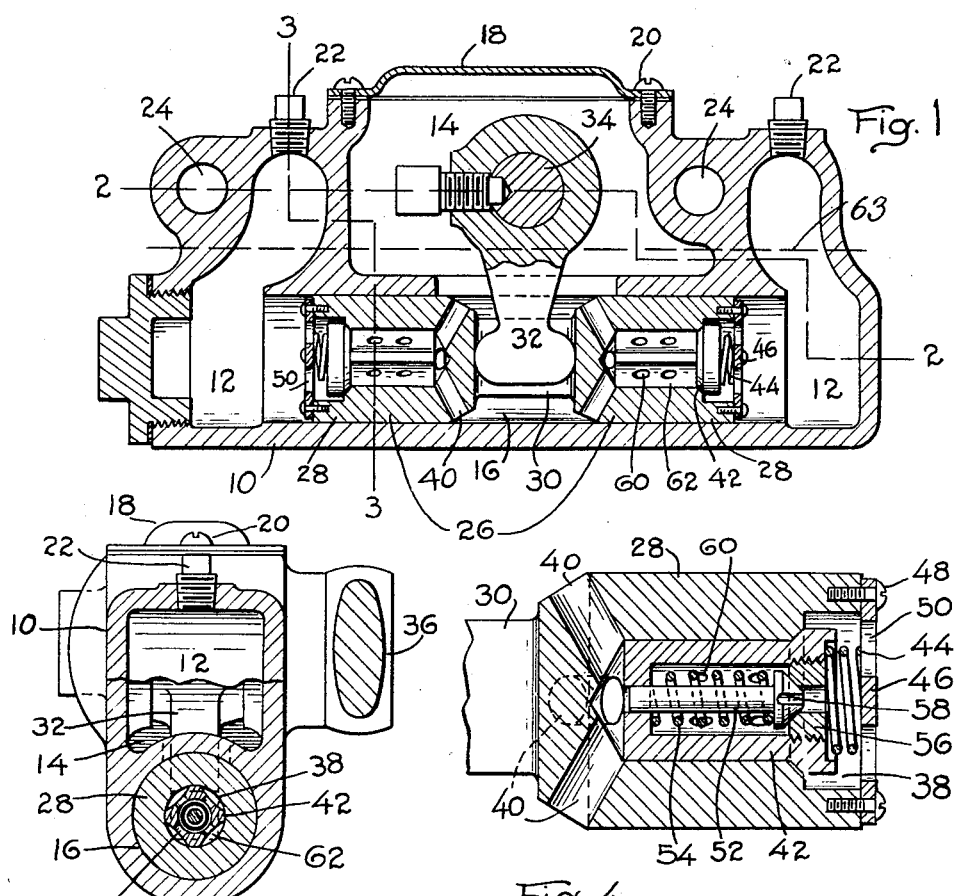
INVENTOR
Harold E. Jackson
BY
Parker & Burton
ATTORNEYS.

Nov. 28, 1933. H. E. JACKSON 1,936,876
SHOCK ABSORBER
Filed Dec. 22, 1927 2 Sheets-Sheet 2

INVENTOR
Harold E. Jackson
BY
Parker & Burton,
ATTORNEYS.

Patented Nov. 28, 1933

1,936,876

UNITED STATES PATENT OFFICE 1,936,876

SHOCK ABSORBER

Harold E. Jackson, Detroit, Mich.

Application December 22, 1927
Serial No. 241,797

6 Claims. (Cl. 188—88)

My invention relates to a shock absorber of a fluid compression type and is adapted particularly for employment on a motor vehicle to limit the shock produced by travel over the road.

An object is to provide such a device having two compression chambers each carrying a determined quantity of liquid and having an air space therein above the liquid level, and compression mechanism connected with the body of the vehicle and responsive to the throw thereof adapted to exert a pressure on the fluid in the respective compression chambers to check the throw of the body. These compression chambers communicate with a source of liquid supply and preferably with each other and are here shown as embodying three aligned chambers, the end ones being the compression chambers and communicating with each other through the intermediate chamber.

A meritorious feature resides in the provision of passageways through the compression mechanism, the restrictions of which are subject to regulation, which controlled passageways regulate the admission of liquid into the compression chambers and limit its exhaust therefrom.

A desirable construction comprises a casing separated into compartments providing at least two compression chambers communicating with each other through a cylinder within which is mounted a double acting piston assembly operable to exert a pressure on the fluid in each chamber. This piston assembly is so constructed as to permit the relatively slow exhaust of fluid therethrough from either chamber and a relatively rapid admission of fluid therethrough to either chamber.

Many other desirable features, characteristics and advantages of my invention will more fully appear from the following specification, appended claims and accompanying drawings, wherein—

Fig. 1 is a vertical sectional view through a device embodying my invention.

Fig. 2 is a cross sectional view taken on line 2—2 of Fig. 1.

Fig. 3 is a cross sectional view taken on line 3—3 of Fig. 1.

Fig. 4 is a cross sectional view through one of the piston heads.

Figure 5:
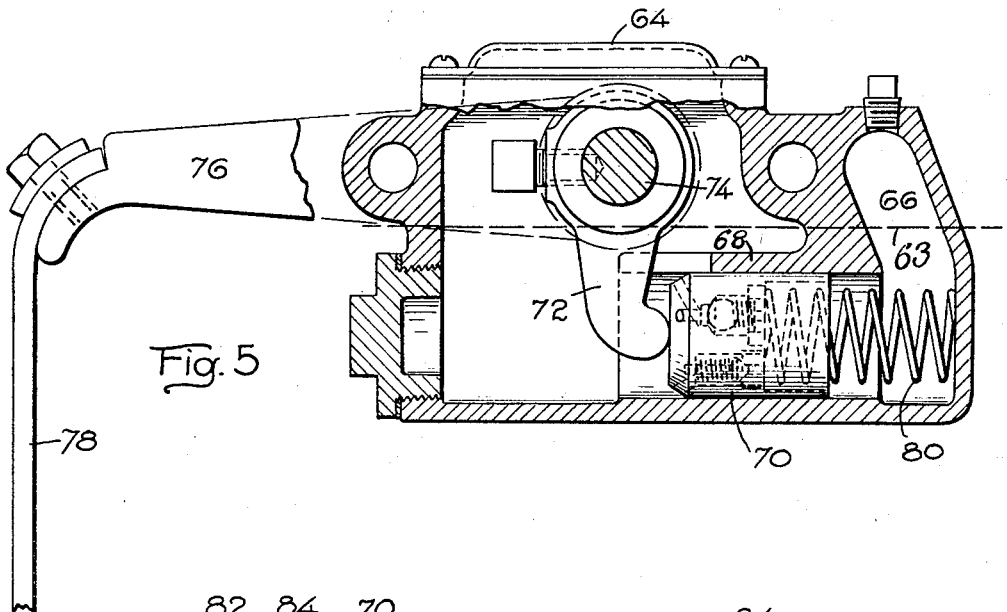
Fig. 5 is a sectional view through a modified form of my invention.

The shock absorber shown in Figs. 1 to 4 is adapted to check the throw of the car in both directions. I provide a casing 10 divided into a plurality of separated compartments or chambers. The two end chambers are indicated as 12 and are adapted to serve as fluid compression chambers. They are separated by an intermediate chamber 14. A cylinder 16 extends from the intermediate chamber into each compression chamber and forms the communicating passageway between the several chambers. The casing is provided with a cover plate 18 which may be secured in position by screws 20 or in any suitable manner. Each compression chamber is shown as provided with a removable plug 22. The openings 24 are adapted to receive rods to support the device in place.

I provide a double acting piston assembly mounted within the cylinder for reciprocation. This piston assembly is indicated as 26 and has a pair of opposed piston heads 28 separated by a connecting portion 30. An operating arm 32 is secured to the shaft 34 which shaft is provided exteriorly of the casing with an arm 36 that may be suitably connected to the vehicle for rotation of the shaft and actuation of the arm positioned between the piston heads so as to reciprocate such piston assembly. Reciprocation of the piston assembly serves to compress the fluid in one compression chamber or the other depending upon the direction of travel of the piston.

In the structure shown in Figs. 1 to 4 each piston is axially cored out as at 38, which cored out opening terminates on the front face in a plurality of passageways 40, four being here shown. An inlet valve 42 is mounted within this cored out opening 38 of the piston and held in place by a weak spring 44, which spring is supported at the opposite end against a plate 46 secured to the rear end of the piston. This plate 46 is held in position by screws 48 and the plate is provided with openings 50.

This inlet valve 42 is axially cored out to receive a spring controlled exhaust valve 52. This exhaust valve is held by a relatively strong spring 54 to its seat in a plug 56 screwed into the end of the inlet valve. The face of the spring controlled valve 52 is here shown as cut away at 58 to provide a normally open minimum outlet. The body of the inlet valve is provided with radial openings 60 for the flow of liquid therethrough. This inlet valve body is provided, as shown in Fig. 3, with flatted or arcuate faces 62 and the radial openings 60 lead from such flatted faces to the interior thereof.

It will be apparent that when the device is in the position shown in Fig. 1 that the liquid stands at a level which may be indicated by the dotted line 63 in such figure and that when the piston assembly is moved towards either compression chamber a restricted amount of liquid may exhaust through the piston passing over the flatted face of the exhaust valve member 52 which is disposed within the inlet valve and through the radial openings 60 in the wall of the inlet valve and over its flatted or arcuate faces to exhaust through the head of the piston into the intermediate chamber.

The exhaust valve within the inlet valve will unseat against the tension of its controlling spring when the fluid in the compression chamber is placed under a determined pressure. The spring which holds the inlet valve to its seat is of such slight strength that when the piston is moving toward the intermediate chamber it permits such valve to unseat and allow the free flow of liquid through the piston from the intermediate chamber into the compression chamber. This flow of fluid may be relatively rapid due to the enlarged character of the passageway as compared with the exhaust of fluid which is relatively slow.

Figure 6:
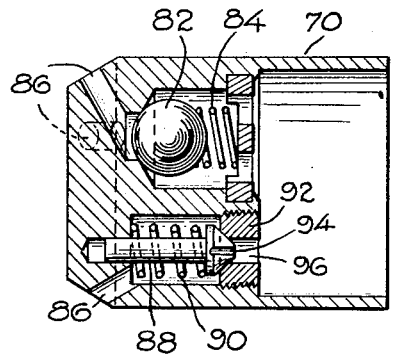
Fig. 6 is a cross sectional view through a piston of a modified form.
Figure 7:
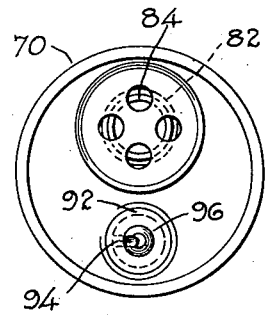
Fig. 7 is a rear end elevation of the piston shown in Fig. 6.
Figure 8:
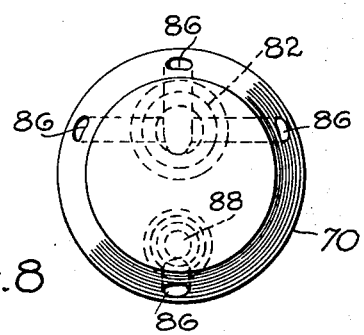
Fig. 8 is a front end elevation of the piston shown in Fig. 6.

In the structure shown in Figs. 5 to 8 I provide a casing having a cover plate 64 and a fluid compression chamber 66 connected through a cylinder 68 with the remainder of the casing. A piston 70 is mounted within this cylinder. It is operated by an arm 72 carried by a shaft 74 which in turn is actuated by an arm 76 that may be connected by a strap 78 with a moving part of the vehicle. This piston is of a somewhat different construction from that shown in Figs. 1 to 4 inclusive. It is cored out as indicated and normally held against its operating member by a spring 80. It carries a ball check valve 82 which controls the admission of liquid to the compression chamber. This ball check 82 is held by a spring 84 to its seat in a cored out opening in the piston and a plurality of outlets, three being here shown, indicated as 86, lead from this cored out opening in the piston. The spring is sufficiently weakened so that the ball check lags after the piston in the movement of the piston away from the compression chamber and permits the admission of fluid into the compression chamber.

The fluid is exhausted from the compression chamber through the piston and this passage is controlled by a valve 88 held to its seat by a spring 90 formed in a screw-threaded plug 92 and the face of this valve is cut away as at 94 to permit a slow bleed of liquid. A passageway 96 leads to the cored out opening into which this valve is positioned.

Each compression chamber has an air pocket above the liquid level therein so that the first movement of the piston is checked by the compression of the air in this air dome and continued movement is checked by the pressure exerted upon the liquid which causes the liquid to bleed out from the compression chamber and also the further compression of the air.

In the operation of the device the liquid is freely admitted into the compression chamber, whether of the single acting or double acting type, but the exhaust of liquid when under compression is restricted.

What I claim is:

1. A shock absorber having two fluid compression chambers separated by a communicating intermediate chamber, a double ended piston assembly adapted to reciprocate in the direction of each compression chamber, a valve within each of said pistons communicating with said intermediate chamber and held yieldingly in closed position, said valve being adapted to open upon withdrawal of the piston from the compression chamber to permit passage of fluid therethrough, and a relatively small opening in the body of said valve communicating with the intermediate chamber, and a valve supported within the body of said first mentioned valve held normally to close the opening therein by pressure directed away from said intermediate chamber.

2. In combination with a double acting shock absorber, an intermediate chamber and a compression chamber, a communicating passage between the two, a reciprocating piston adapted to slide within the communicating passageway, a relatively large passageway through said piston between the two chambers, means normally closing said passageway on movement of said piston toward said compression chamber and adapted to open on movement in the reverse direction, a relatively small passageway within said means between said chambers, and means supported within said first mentioned means for normally closing said second passageway and adapted to open upon movement of said piston toward said compression chamber.

3. In a fluid shock absorbing device, the combination of a casing having a fluid chamber, a plunger movably supported within said casing, means engaging said plunger for moving the same in opposite directions, and a check valve disc supported by the piston and provided with a resiliently supported portion forming a pressure relief valve for permitting relative flow of fluid past the piston in one direction and a restricted relative flow of fluid past the piston in the opposite direction.

4. In a hydraulic shock absorber, a casing containing a fluid and having a cylinder, a piston reciprocally mounted in said cylinder, a port in said piston and a valve device movable as a unit to constitute a check valve and provided with a normally closed resiliently controlled passage therethrough adapted to be opened by pressure in one direction.

5. In a hydraulic shock absorber the combination with a reciprocable ported piston of a valve device for controlling said port, said valve device including a check valve seating on a seat formed on said piston and provided with a passage therethrough and resilient means normally closing said passage and operable by pressure for opening said passage.

6. A shock absorber comprising a casing having a cylinder formed therein, a piston reciprocable in the cylinder, operating means connected with the piston, an outwardly-opening check valve mounted on each end of the piston, an inwardly-opening relief valve mounted on one of the check valves, a closure member attached to each end of the cylinder to form a compression chamber at each end of the piston, parts of the shock absorber being formed with passages permitting escape of liquid from each compression chamber.

HAROLD E. JACKSON.